July 22, 1947.   N. MILLER   2,424,363
EYE TESTING APPARATUS FOR INDICATING PUPILLARY DIAMETERS
Filed Dec. 9, 1943   6 Sheets-Sheet 1

Inventor
Nicholas Miller

Fig. 6.

July 22, 1947.  N. MILLER  2,424,363
EYE TESTING APPARATUS FOR INDICATING PUPILLARY DIAMETERS
Filed Dec. 9, 1943  6 Sheets-Sheet 5

Inventor
Nicholas Miller

Inventor
Nicholas Miller
Attorney

Patented July 22, 1947

2,424,363

UNITED STATES PATENT OFFICE 2,424,363

EYE-TESTING APPARATUS FOR INDICATING PUPILLARY DIAMETERS

Nicholas Miller, Berwyn, Ill.

Application December 9, 1943, Serial No. 513,555

16 Claims. (Cl. 88—20)

The purposes and objects of the present invention are to provide an instrument which will accurately measure and record the dilations and contractions of the pupil of the eye when it is subjected or exposed to varying intensities and conditions of light. Such measurements and recordings are particularly valuable for determining whether the pupillary reactions of a subject or person under examination are normal, by comparing the recordings obtained with a master chart which shows the limits of the normal pupillary reactions when subjected to the same range of light intensities.

The present device is particularly well adapted to measure and record the pupillary reactions of the eye when it is exposed to low light intensities. An accurate knowledge of this is essential in connection with the determination of "night vision," which is of great importance in military and civil aviation, and also in various other occupations in which tasks must be performed at low levels of illumination.

Means are further provided for exposing the eye to various intensities of monochromatic or composite colored lights, and for measuring and recording the pupillary reactions to such lights. Such measurements are of particular value in the investigations of color blindness.

Provision is also made to direct upon the eye polarized light of varying intensities and for adjusting the polarizing axis relative to the eye, and for measuring and recording the corresponding changes in the pupil of the eye.

With the present invention, an operator or clinician measures and records graphically on a chart the variations in the diameter of the pupil of the eye of a subject or person under examination, when the eye and the pupil are subjected to a predetermined series of light intensities.

It is well known that when only one eye of a person is exposed to different light intensities, the pupils of both eyes will contract or dilate according as the light intensity on the eye is increased or decreased, but this reaction is not of the same degree for both eyes, being greater for the eye exposed to the light. Hence, in the present invention the source of light and the means for controlling the light are so arranged that the eyes of the person under examination can be exposed either simultaneously or alternately to the same or different series of light intensities. Further, the mechanism which controls the measurements and records graphically the variations in the pupil diameter of the right eye is adapted to be used also for the left eye, which results in a simple mechanical arrangement and makes it possible to delineate the graphs of the pupils for both eyes on the same chart or on separate charts, as may be desired.

To the attainment of these ends and the accomplishment of other new and useful objects as will appear, the invention consists in the features of novelty in substantially the construction, combination and arrangement of the several parts, hereinafter more fully described and claimed and shown in the accompanying drawings, and in which:

Figure 1:
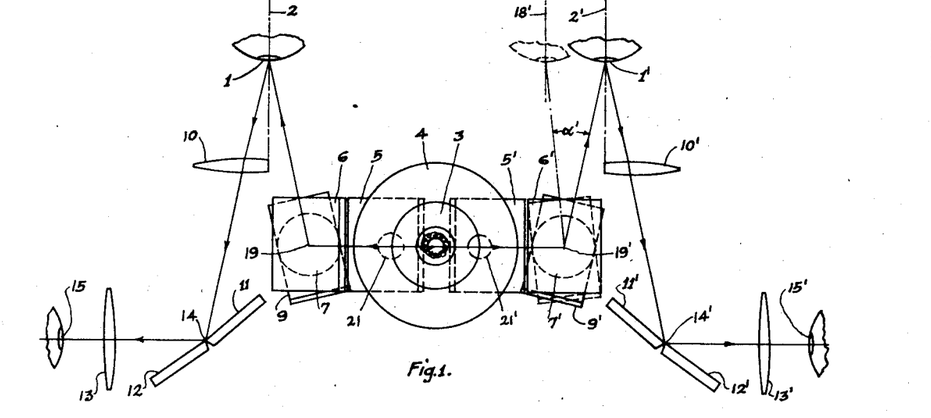
Figure 1 represents a diagrammatic plan view of the optical arrangement of the instrument, with the mechanical supports and operating mechanisms omitted.
Figure 2:
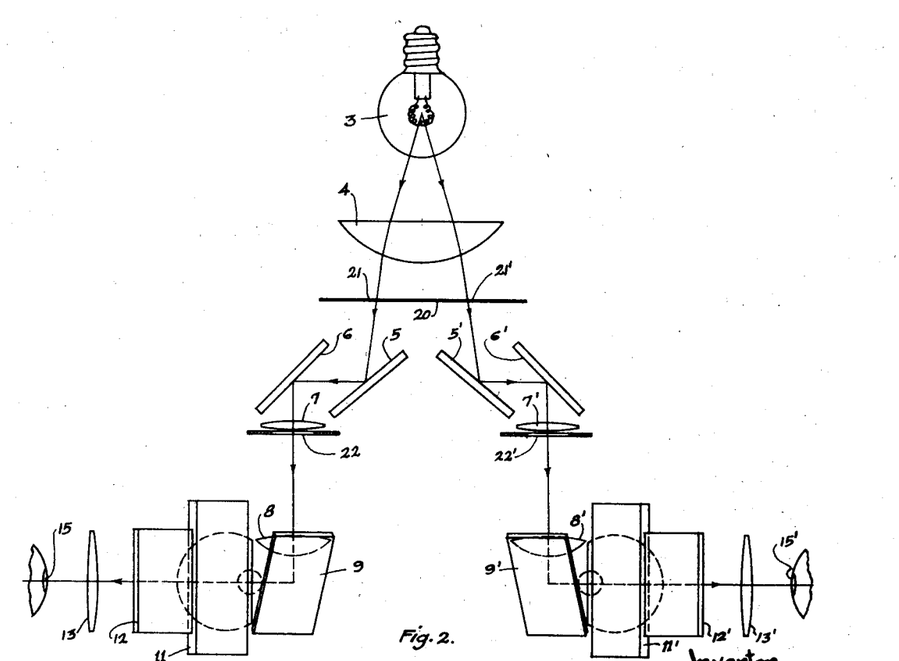
Figure 2 is a side view of Figure 1.
Figures 3, 4, 5:
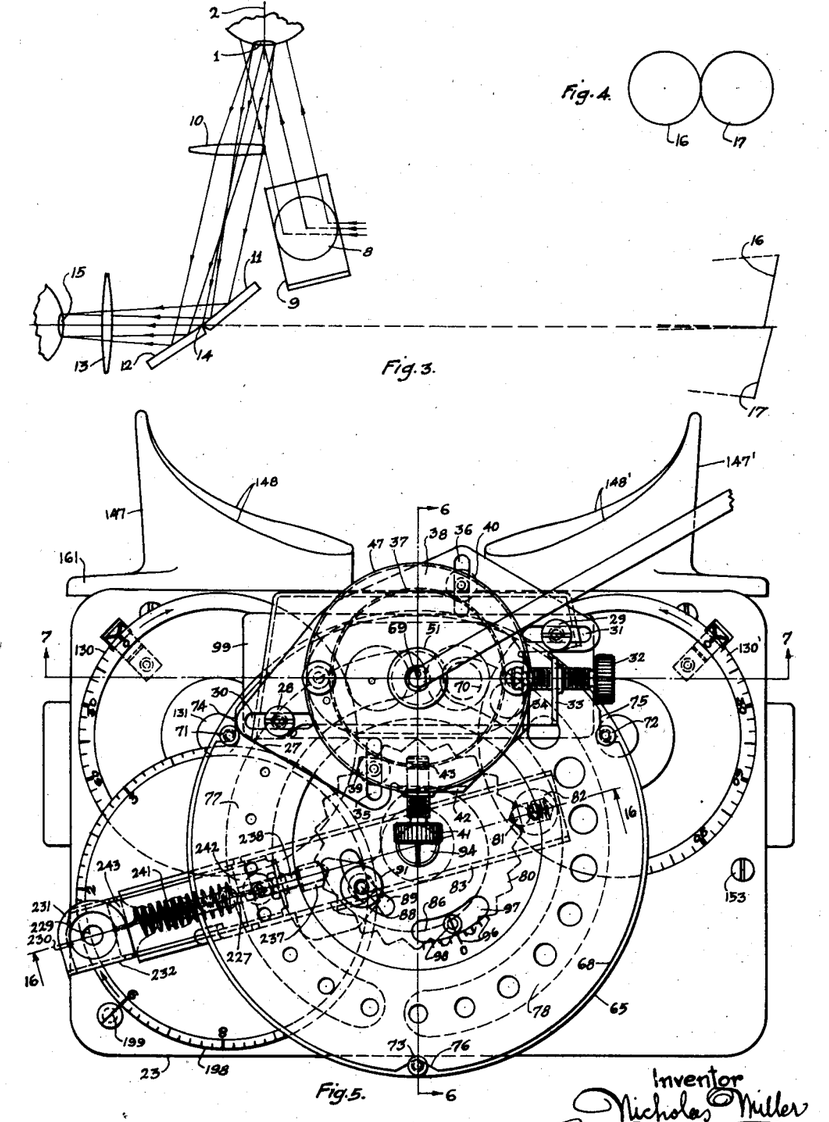
Figure 3 is a diagrammatic view showing the formation of the pupil images.
Figure 4 is a view showing the pupil images in tangency as they appear to the observer or operator.
Figure 5 is a plan or top view of the instrument.

The principle of the instrument will be best understood with reference to the diagrammatic Figures 1, 2, 3 and 4. In Figure 1, the numeral 1 represents the pupil of the right eye of the subject or of the person under examination. The axis of the pupil is shown at 2, and on the right side of this axis is positioned the light source and the optical elements adapted to illuminate the pupil. In Figures 1 and 2, 3 represents a light source or lamp, 4 represents a condenser lens for collecting and projecting cones of rays issuing from the source to reflectors 5 and 6, which direct the rays downward to the field lens 7 and the objective 8, which projects a light field to the reflector 9 and thence to the pupil 1.

For varying the intensity of illumination on the eye, a plate or disc 20, Figure 2, which is provided with a series of graduated apertures, is positioned in the light field of the condenser for allowing predetermined quantities of light to pass to the reflectors 5 and $5^1$, whence it is transmitted to the eyes of the subject. This plate is manually adjustable so that the series of apertures can be brought into position successively to vary the illumination on the eyes in predetermined steps. Adjacent apertures 21 and $21^1$ are spaced so that both eyes will be illuminated simultaneously. If it is desired to illuminate only one eye, then the light field for the other eye is blocked off by interposing an opaque shield between the aperture and the eye in a manner hereinafter to be described.

The function of the lenses 7 and 8 is to project on the eye a light field which will cover the pupil and the surrounding cells which are influential in affecting pupillary reactions. This light field should also be uniform and be proportional in intensity to the aperture areas in the light field. An aperture 22 limits the light passing through the lens 7, and the intensity of this light varies directly with the area of the aperture 21, when the light field under the condenser is uniform. The lens 8 receives the light issuing from the condenser 7, and its focal length is so chosen that it will project an image of the aperture 22 substantially upon the eye. Thus the light field projected upon the eye will be of constant size, irrespective of the variation of the size of the aperture 21, shown in Figure 3, but the intensity of this light field will be proportional to the area of this aperture.

Figure 3 shows the rays from the illuminated pupil incident upon the lens 10 which projects the pupil rays to a fixed reflector 11 and to the reflector 12, which is adapted to be tilted with respect to the reflector 11 about an axis at 14, where their surfaces meet. When the planes of these reflectors coincide, they will reflect a single virtual image of the pupil 1 formed by the lens 10 which can be observed through the lens 13. The eye of the observer or operator is shown at 15. If, however, the reflector 12 forms a small angle with the reflector 11, two virtual images of the pupil 1 will be produced, and by tilting the reflector 12 these pupil images can be moved into a position of tangency, and observed through the lens 13 which serves as a magnifying eye-piece for the operator viewing the pupil images. The paths of some of the rays forming these images 16 and 17 are shown in Figure 3. Figure 4 shows the way these images will appear to the operator. The adjustment of the angle between the reflectors 11 and 12 to obtain this relationship of tangency of the pupillary images is dependent only on the size or diameter of the pupil, so that the magnitude of this angle becomes a measure of the pupil diameter, which by suitable mechanical means can be translated into numerical values expressed in millimeters or other linear measure. It will also be clear that by varying the intensity of illumination upon the pupil by progressive steps, a series of measures of the pupil diameters can be obtained, which by appropriate mechanical means can be delineated on a graph showing the relationship of the pupil diameters to the illumination intensities which produced it.

The optical elements for observing the pupillary reactions of the left eye are similar to those described for the right eye, and are positioned in a symmetrical relation with them. In Figures 1 and 2 the corresponding optical elements for the right and left eye are represented by the same numbers, but accented for the left eye.

It will be observed that with this arrangement of the optical elements for the two eyes, one source of light 3 and condenser 4 are used for obtaining the illumination for both eyes of the subject. By the provision of means for adjusting the position of the source and condenser between the optical systems for the right and left eye, the illumination on them can be equalized; or, if it is desired, the relative illuminations for the two eyes can be varied in a predetermined ratio by means of this adjustment. However, the provision of other means for varying the illumination intensity on either eye independently, will hereinafter be described.

In Figures 1 and 2, the axes 2 and $2^1$ for the pupils of the right and left eyes are fixed positions on the instrument, at which all of the pupillary measurements and recordings are taken. The distance between these axes is made somewhat greater than the maximum interpupillary distance for the human eyes, and if, while the pupil of the right eye is being examined, it is desired to illuminate the left eye simultaneously, it will be necessary to move the light field incident upon the left eye in accordance with the pupillary distance of the person under examination. For example, the interpupillary distance in a particular case is shown by the pupil axis positions 2 and $18^1$ for the right and left eyes, respectively, and in order to illuminate the left eye, the axis of the light field must be turned from its initial position at $2^1$ to the new position $18^1$. This is accomplished by rotating the reflector $9^1$ about a vertical axis $19^1$ through an angle $\alpha^1$. The illumination of the right eye is obtained similarly when the left pupil is under examination. The mounting of the lamp 3 and condenser 4, and their adjustment and operation with respect to the optical system for controlling the light field upon the pupils of the eyes, will be described with reference to the Figures 5, 6 and 7.

The base plate of the instrument, upon which all the supporting elements and operative mechanisms are mounted, is shown at 23. A bracket 24 supports the lamp and the condenser and the various adjusting means provided for them, and is secured to the base plate by the screws 25. The upper part 26 of this bracket is bent parallel to the plate plate 23, and on its top surface it supports a sliding plate 27. The sliding plate is mounted on the surface 26 by the shoulder screws 28 and 29, passing through the slots 30 and 31, and fastened into the part 26, Figure 5. A thumb screw 32 is threaded into an upwardly bent lip 33 on the part 26, and a groove on the end of this screw fits into a slot on the upward projection 34 on the sliding plate 27, so that by the turning of this screw the sliding plate can be moved parallel to the slots 30 and 31 and its position accurately adjusted on the part 26, Figures 5 and 7.

The sliding plate is provided with two other parallel slots 35 and 36 at right angles to the slots 30 and 31. A tubular member 37 provided with a flange 38 at its lower end, rests upon the sliding plate 27 and is held slidingly in contact with it by two spring washers in combination with the shouldered studs 39 and 40 passing through the slots 35 and 36 and riveted on the flange 38, Figures 5 and 6. Another thumb screw 41 is threaded into the upturned lip 42 on the sliding plate 27, and a groove on the end of the screw fits into a slot in the wall of the tube at 43, so that by the turning of this screw the tube can be moved parallel to the slots 35 and 36, and its position accurately adjusted on the sliding plate 27, Figures 5 and 6.

It will be clear from the above description that the lamp 3 and condenser 4, which are supported in the tube 37, can be accurately adjusted horizontally in any direction within the limits of the two pairs of guide slots on the sliding plate 27.

Figure 6:
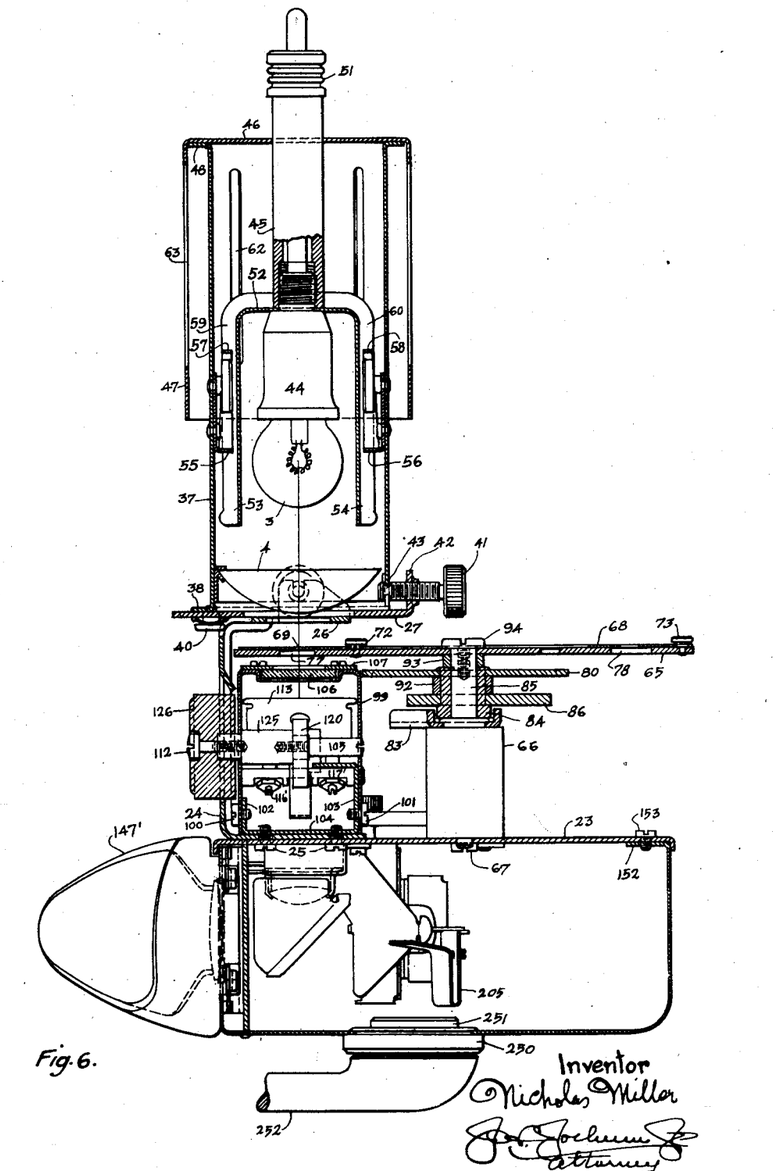
Figure 6 is a section along the line 6—6 on Figure 5.
Figures 7, 8:
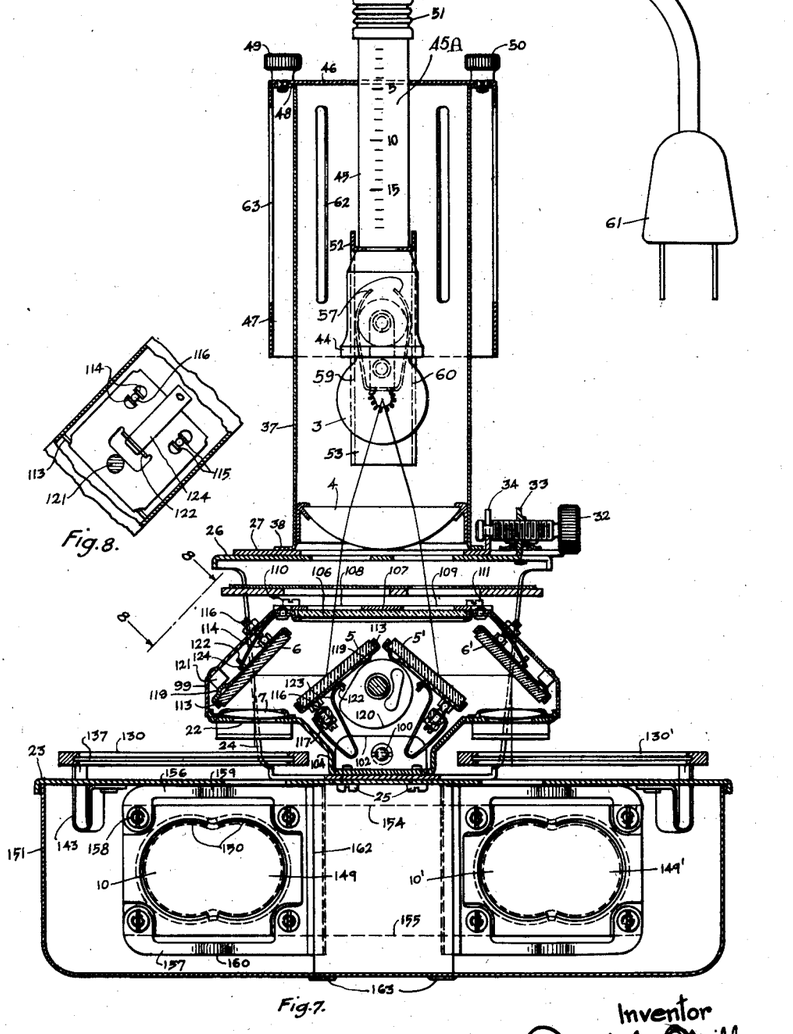
Figure 7 is a section along the line 7—7 on Figure 5.
Figure 8 is a partial view of the reflector 6 and its mounting, along the line 8—8, Figure 7, with part of the casing for the reflectors cut away.

The lamp 3 is further adapted to be adjusted vertically with respect to the condenser 4 for the purpose of varying the intensity of illumination or for obtaining evenness of the light field, which is to be projected upon the pupils of the eyes. The lamp 3 fits into a receptacle 44 which in turn is threaded into a sleeve 45. This sleeve is adapted to slide in a hole in the center of the circular plate 46, which encloses the upper end of the cylindrical shade 47, and which is secured to the upper flange 48 of the tube 37 by the shouldered thumb screws 49 and 50. A knob 51, threaded into the upper end of the sleeve, serves for manually raising and lowering the lamp relative to the condenser. In order to centralize the movement of the lamp inside the tube, a yoke member 52 is provided, clamped between the shoulder of the receptacle and the end of the sleeve 45, Figure 6. Two downward projecting prongs 53 and 54 of the member 52 are in sliding contact with the inside surface of the tube. Spring members 55 and 56, riveted to the inside surface of the tube, are provided with upwardly projecting pairs of prongs 57 and 58, which press against the flanges 59 and 60 of the member 52, and thereby hold it and the lamp 3 frictionally in their adjusted position, Figures 6 and 7. The sleeve 45 is provided with scale graduations, 45A, which aids in resetting the position of the lamp with respect to the top surface of the plate 46, when desired, as shown in Figure 7. The insulated wires for the lamp pass through the sleeve 45 and terminate in the plug 61. By removing the thumb screws 49 and 50, the complete lamp assembly can be lifted out of the tube 37, for changing or replacing the lamp. The vertical staggered slots, such as 62 and 63, serve as ventilating apertures for the convection air currents and, at the same time, prevent the scattering of light rays outside of the lamp enclosure.

A rotatable light metering disc provided with a series of graduated holes or apertures is positioned in the light field of the condenser, and is adapted for bringing the metering apertures successively in the path of the optical system, which projects a light field of constant area, but of varying intensity, upon the pupils of the eyes. These light intensities vary directly with the areas of the holes or apertures. Thus, for example, if the metering disc is provided with 22 apertures, graded as to areas in geometrical progression having a constant ratio of 1:26, then the ratio of light intensities projected upon the pupil will be 1:128. By virtually the candle power of the lamp, or its distance from the condenser, or the watt input of the lamp by an adjustable rheostat, etc., the light intensity range obtainable by such a metering disc can be extended indefinitely. Further, since it is often desirable to make pupillary measurements with variously graded metering apertures or with various shapes of apertures, means are provided for the easy and quick removal or replacement of the metering discs.

A knurled wheel 65 (Figures 5, 6, and 16) is rotatably mounted upon a stud 66 which is fastened upon the base 23, by the screws 67. Resting upon the top surface of this wheel is a thin flexible annular disc 68, having a series of metering holes, varying from the smallest hole 69 to the largest hole 70 (Figures 5 and 6). This metering disc is held in place by three small studs 71, 72 and 73 fastened on the wheel 65 near its periphery, and engaging the three notches 74, 75 and 76 on the metering disc 68. By warping the metering disc into an arcuate shape, it can readily be removed or snapped in place on the wheel 65. The wheel 65 is provided with two arcuate openings 77, 78 for allowing the free passage of light rays through the metering apertures.

To assist in turning the metering apertures successively into the light field of the condenser, a notched wheel 80 is fastened to the wheel 65 (Figures 5, 6 and 16), the notches of the wheel cooperating with a spring actuated ball detent 81, which slides freely in a hole on a stud 82, bolted on a channel shaped member 83 which is staked on the stud 66. The notches have the same angular spacings as the corresponding metering apertures under the light field, so that the operator can successively position the metering apertures by the "feel" of the fingers when turning the wheel 65.

A hub 84 is mounted for free rotation on the cylindrical extension 85 of the stud 66, and seated on a shoulder of the hub is a cam 86 (Figures 5, 6 and 16), the functions of which will hereinafter be described in connection with the recording mechanism. A stud 87 is riveted on the cam, and a reduced extension 88 of the stud projects through a hole in the notched wheel 80, and also through an arcuate slot 89 on the wheel 65. A spacer 90 on the extension 88 separates the notched wheel 80 and wheel 65, and a knurled nut 91 on the threaded end of the extension 88 ties the cam 86, the notched wheel 80 and the wheel 65 to form an integral assembly. On the hub 84, a spacer 92 separates the cam and the notched wheel, and another spacer 93 locates the wheel 65 on the hub 84. A screw 94 threaded into the end of the stud extension 85, retains the wheel 65 while allowing free rotation of the hub 84.

When it is desired to illuminate both pupils simultaneously, the metering apertures are positioned centrally, so that both of the reflectors 5 and 5¹ (Figures 1, 2 and 7) will receive the light rays from the apertures. However, if only one pupil is to be illuminated, it will be desirable at times to shift the metering apertures toward the right or the left of the vertical center line. For making this adjustment, scale markings 96 are provided on the wheel 65 (Figure 5), which are symmetrically positioned with respect to a central or zero position. Adjacent to the scale mark is an arcuate slot 97 through which projects a stud 98 fastened to the notched wheel 80 and provided with an indication mark, so that the position of the metering disc and apertures can be adjusted to a desired extent on one side of the zero mark for the right pupil, and a like amount on the other side of the zero mark for the left pupil. To make this adjustment, the knurled nut 91 (Figures 5 and 16) is loosened, so that the wheel 65 is freed for adjustment with respect to the notched wheel 80. After adjustment, the nut 91 is again tightened to lock the wheels together.

The light passing through the metering apertures is incident upon the reflectors 5 and 6, and $5^1$ and $6^1$, for directing the light fields to the right and left pupils of the eyes (Figures 1, 2 and 7). The angularity of the reflectors 5 and $5^1$ is dependent upon the angle of the rays passing through the metering apertures, which in turn depends upon the height of the light source or lamp from the condenser lens, and the lateral position of the metering aperture in the light field. For this reason the angular position of the reflectors 5 and $5^1$ is made adjustable, and means are provided whereby the same adjustment will impart to the reflectors 5 and $5^1$ substantially the same angular displacement. The reflectors 6 and $6^1$, which receive the rays from the reflectors 5 and $5^1$, are fixed in their case or support. Means are provided for both pairs of reflectors for the initial adjustment or calibration of their planes of reflection. The functions and structure of the two pairs of reflectors being identical, only those for the reflectors 5 and 6 will be described in detail. Corresponding parts are designated by the same numbers, but those serving the left eye are accented. The two pairs of reflectors are mounted in a casing 99 (Figures 5, 6 and 7), which is fastened by the screws 100 and 101 to the upturned projections 102 and 103 on a bracket 104. The base of this bracket rests on the lamp supporting bracket 24, and is threaded for the screws 25 for clamping both brackets to the base 23. The casing 99 is provided with a recess, adapted to support a transparent glass plate 106 for sealing the case against the entrance of dust or foreign matter. A retaining plate 107, having two spaced apertures 108 and 109 for the entrance of light rays, is fastened on the top of the case by the screws 110 and 111.

The reflectors 5 and 6 are supported in identical holders (Figures 6, 7 and 8). One bent edge 113 of these holders extends across the walls of the casing, centralizing and guiding the positions of the reflectors in the casing. Two pairs of sheared parallel projections 114 and 115 are provided for guiding the spherically formed ends of the adjusting screws 116. For the reflector 5 these adjusting screws are threaded into a stud 117, which is fastened to the walls of the casing (Figures 6 and 7). For the reflector 6 the adjusting screws 116 are threaded into the wall of the casing (Figures 7 and 8). The holders are further provided with a bulge 119 which, for the reflector 5, rest on a cam 120 and, for the reflector 6, on the face of a stud 121 riveted on the casing wall. It will be apparent that the two adjusting screws 116 and the bulge 119 provide a three-point support, and that by these screws the planes of the reflectors 5 and 6 can be adjusted or calibrated, relative to one another and with respect to the co-operating optical elements.

The reflector holder is also provided with a sheared projection 122 which, for the reflector 5, engages one end of a formed spring 123, the other end of which is riveted to the stud 117, and which pulls the reflector holder yieldingly against the adjusting screws 116 and the cam 120. Similarly, for the reflector 6, a spring 124 riveted to the casing, pulls the reflector holder against the adjusting screws 116 and the stud 121.

After the adjustment or calibration, the reflector 6 remains fixed, but the reflectors 5 and $5^1$ are movable by the rotation of the cam 120, which is designed to impart to both reflectors substantially the same angular displacement. The cam is supported for rotation on a shaft 125 journaled in the sides of the casing and provided with a dial knob 126 for adjusting the position of the cam 120, and thereby the reflectors 5 and $5^1$. For ease of assembly, one end of the shaft consists of the screw stud 105. The dial knob is fastened to the shaft by the screw 112.

Figures 9, 10, 11, 16, 17, 18:
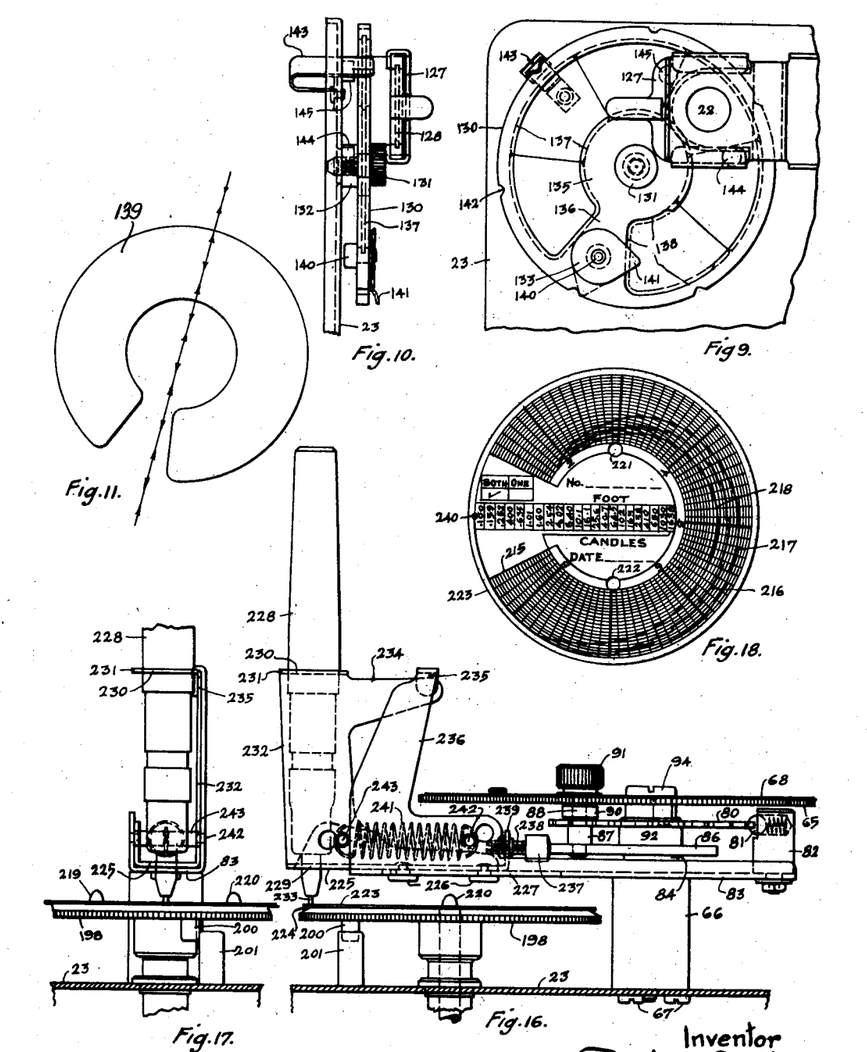
Figure 9 is a partial top view showing the slide and rotatable disc which are used for inserting various screens and filters into the light field.
Figure 10 is a partial side view of Figure 9.
Figure 11 is a polarizing screen to fit the disc holder shown in Figures 9 and 10.
Figure 16 is a partial outside view along a plane parallel to the line 16—16, Figure 5.
Figure 17 is a partial end view of Figure 16.
Figure 18 is a plan view of a chart used with the instrument.

The bracket 104 supports the field lens 7 above the aperture 22. Directly under the aperture, the sides of the bracket 104 are formed to receive and support the slide 127 (Figures 7, 9 and 10). The slide 127 is provided with a groove to receive screens or filters 128 which, when they are inserted under the aperture 22, will modify the light intensity or its color, or polarize it in a predetermined direction of the polarizing axis, as may be desired. A set of these slides, fitted with various filters, colored screens, polarizing screens, etc., are provide as accessories for the instrument.

A disc 130, knurled on its outside edge (knurl not shown), is mounted for rotation on a shouldered screw 131 provided with a knurled head, which threads into a hub 132 fastened on the frame 23 (Figures 5, 7, 9 and 10). By means of the knurled headed screw, the disc can be readily removed or replaced. The inner part of the disc has a partial annular opening, and the outer rim of this opening is joined to the inner part 135 by the tapered arm 136. The inside edge of the opening is grooved, as shown by the dotted lines at 137 in Figures 9 and 10, and in section in Figure 7. Part of the wall of this groove is cut away, as shown at 138, so as to make it possible to slide or thread into this groove a partial annular plate or screen 139, shown in Figure 11. A spring washer 133 is rotatably mounted on the arm 136 by means of the shouldered stud 140. The bent end 141 of this washer may be slightly raised by the fingers and turned into the position shown by the dotted lines, when it is desired to insert an annular screen or plate. When the washer is turned back to its normal position, shown by the full lines, it acts as a retaining or locking means for the end of the screen or plate 139.

When the disc is mounted in its position shown in Figure 9, the annular screen or plate will be directly under the aperture 22, and in the field of light. Preferably, sets of these discs fitted with various filters, colored screens and other light-modifying materials, are provided as accessories for the instrument. For example, an annular disc may be composed of an "optical wedge," that is, a screen with graduated translucency and of a neutral or gray color, which when introduced into the light field, may be used to modify the light intensity any desired amount. This method is a convenient means for balancing or equalizing the light field for the pupils of both eyes. For this purpose the outside edge of the disc is preferably provided with graduation or scale marks and numbers, as shown in Figure 5, where such marks are related to definite transmission values of the optical wedge.

Another example is the use of colored screens or filters. A series of six of such are shown in Figure 9, which can be brought successively into the field of light. In this case the disc is prferably provided on its periphery with notches 142 co-acting with a spring detent 143, which is riveted to the base 23 (Figures 9 and 10). The action of this detent upon the disc permits the operator to "feel" when the filters are brought successively into the light field, by the turning of the disc with the fingers. When a disc is provided with scale marks but no notches, then the spring detent 143 serves to hold the disc frictionally in its adjusted position.

An important application of these discs is with a polarizing annular screen, shown in Figure 11, the arrows indicating the direction of the polarizing axis. This screen is used with a disc provided with scale divisions, which are correlated to the angular displacements of the polarizing axis, in the field of light. The V shaped end of the spring detent 143 is the indicator with reference to the scale marking on the disc. This annular polarizing screen may also be used in combination with a polarizing screen in the slide 127, directly above the annular screen. In this case, when the polarizing axes in the slide and the disc are parallel, the maximum intensity of light will be transmitted, and when these axes cross, most of the light will be extinguished. The scale readings on the disc are correlated to the intensity of the transmitted light. This method may also be used for varying the light intensity projected upon the pupil.

The shouldered stud 140 which holds the spring washer 133, extends downwardly, and acts as a stop against the studs 144 and 145 (Figures 9 and 10), limiting the motion of the disc in both directions.

The above described slides and discs in combination with various screens and filters may be used independently for either pupil of the eye, or for both eyes simultaneously. An opaque screen in a slide serves as a convenient means for blocking the light rays from reaching either pupil, when it is desired to measure the pupillary reactions of one pupil while the other one is unilluminated.

The light passes from the field lens 7 through the filters or screens in the slide or discs, if any, to the objective lens 8 which projects the light field upon the pupil of the eye at 1, after reflection by the reflector 9 (Figures 1, 2 and 3). To protect the eyes from stray light and to properly position the pupils of the eyes with respect to the optical systems provided for their illumination and measurement, the eye shade members 147 and 147¹ are provided for the right and left eyes, as shown in Figures 5, 12 and 14, and the contours 148 and 148¹ on these shades fit closely around the eyebrows, temple and cheek.

It was stated, in connection with Figure 1, that the positions of the pupil axes 2 and 2¹ are fixed with respect to the instrument, and that their spacing is somewhat greater than the maximum interpupillary distance for the human eyes. These axes are fixed by the extreme positions of the right and left eye shades 147 and 147¹ (Figure 5). If then, for example, the right pupil of a person is under examination, it will be necessary to move the shade 147¹ for the left eye toward the shade 147 for the right eye in order to protect it from stray light. Similarly, if the left eye is being examined, the shade 147 for the right eye must be moved toward the shade 147¹, according to the interpupillary distance of the subject or person under examination. Further, if it is desired to illuminate both pupils while the measurements on one are taken, it will be necessary to shift the light field with the movement of the eye shade so that the light field will continuously be projected upon the pupil.

Figures 12, 13, 14, 15:
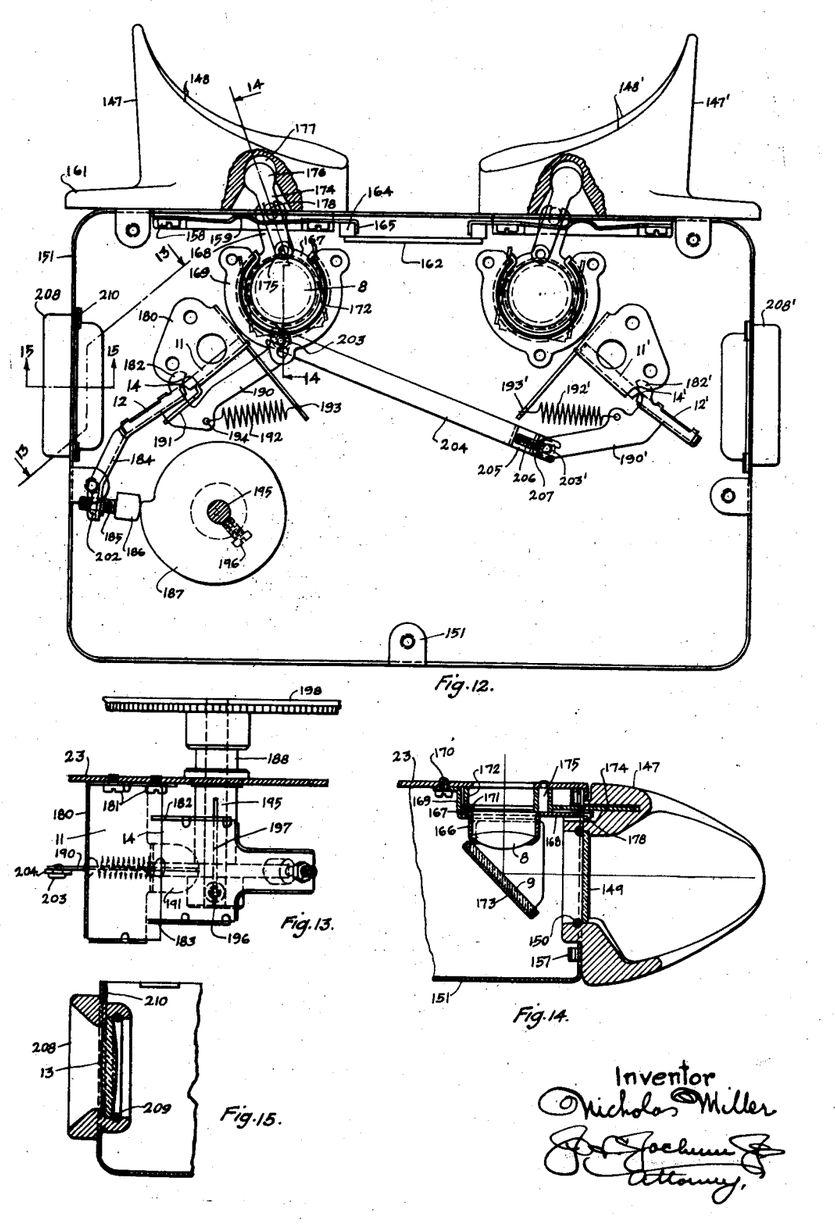
Figure 12 is a top view of the instrument with the base plate removed, showing the inside of the case.
Figure 13 is a partial sectional view of the image-forming reflectors, along the line 13—13, Figure 12.
Figure 14 is a partial sectional view along the line 14—14, Figure 12, showing the light-deflecting arrangement.
Figure 15 is a partial section along the line 15—15, Figure 12.

The shade member 147 is provided with a double segmental recess, into which is fitted the lens 10, which is part of the optic system for measuring the diameter of the pupil, and a transparent glass plate 149 (Figures 7 and 14). The lens and glass plate are held in their recess by arcuate spring wire retainers 150, which are sprung into a groove provided on the inside wall of the recess. The shade member 147 is supported on the side of a case 151. The case is provided with a number of lugs such as is shown at 152, to serve as fastening means to the base plate 23 by the screws 153. The wall of the case 151, adjacent to the shade members is provided with an opening along its length, shown by the lines 154 and 155 (Figure 7), and into this opening is fitted for sliding motion that part of each shade member which forms the recess for the lens 10 and glass plate 149 (Figures 7, 12 and 14). In order to retain and to hold the shade member 147 against the side of the case, a spring plate having two prongs 156 and 157 is fastened to the shade member by four screws, such as is shown at 158. These prongs are provided with arcuate humps 159 and 160 which bear resiliently against the upper and lower sides of the opening, and thereby hold the shade member firmly in contact with the side of the case. A flange or extension 161, integral with the shade member 147 and in contact with the outside surface of the case, serves to cover up the opening on the case when the shade member is moved toward the right, and thus prevent stray light or dust entering the case. A plate 162, parallel to the side of the case, is staked to the bottom of the case, as shown at 163. A strip 164, made preferably of felt or similar material and cemented into the corner formed on the spring plate by the bent edge 165, is adapted to slide in contact with the surface of the plate 162 for effectively sealing the opening on the case against the entrance of stray light or dust at this point.

The projection lens 8 is mounted in a tubular member 166, which is provided with a flange or rim 167 at its upper end, and this flange is extended at one point to form the slotted lever 168 (Figures 12 and 14). A circular bracket 169, fastened to the base plate 23 by three screws, one of which is shown at 170, supports the flange 167 and guides the tubular member 166 for free rotary movement. An annular spring washer 171 is placed so as to exert pressure between the base plate 23 and the flange 167 through a spacer 172, for firmly holding the flange 167 against the bracket 169. Part of this bracket is cut away so as to clear the lever extension 168 during its movement. A member 173 having a U shaped cross section, supports the reflector 9 and is rigidly fastened to the tubular member 166, so that the reflector makes an angle of 45° with the axis of the projection lens 8. It will be evident from this construction that when the tubular member is rotated, the light field, projected by the lens 8 and reflected by the reflector 9, will move with it, and in order that the light field shall always be projected upon the pupil, it is necessary to tie up the rotary motion of the tube 166 with the sliding adjustment of the shade member 147, which is positioned in accordance with the interpupillary distance of the subject or person under examination, as has been explained. To accomplish this, a lever 174 is pivotally anchored on the base plate 23, at 175, and a circular end 176 of this lever engages a slot 177 provided in the shade member 147, so that the sliding motion of the shade member will impart a rotary or rocking motion to the lever 174 about its pivot 175. A stud 178 on the lever 174, engages the slot of the lever 168, and thereby transmits to the tubular member a similar rocking motion. The connections of these levers are so proportioned that the angular motion imparted to the reflector 9 will cause the light field to be projected substantially to the same region inside of the eye shade member 147.

A similar construction applies to the shade member 147¹ for the left eye.

The measurement of the pupillary diameters as described in connection with Figure 3, depends upon the adjustment of the angle between the reflectors 11 and 12 in such a way as to bring the pupillary images into tangency. The means for accomplishing this is shown in Figures 12 and 13. The reflector 11 is cemented in a holder 180 which is fastened on the base plate 23 by screws 181. One vertical edge of this reflector is slightly beveled, and this edge is in contact with a similarly beveled edge of the movable reflector 12 at the axis of rotation 14. These edges on both reflectors are ground straight and smooth, so that their reflecting surfaces are in intimate contact along this line. This is a very desirable condition, for the formation of the image points of tangency of the pupil images are dependent on the pupil rays incident upon the reflectors at and near this line, and any separation of the reflectors would diminish the distinctness of the pupil images along their point of tangency.

To maintain the intimate contact of the reflectors along the line or axis 14, the reflector holder for the reflector 12 is provided with two lips 182 and 183, and the reflector 12 is cemented into its holder in such a way that its beveled edge at 14 will precisely line up with the inclined surfaces of these lips. Hence, the reflector edge and the inclined faces of the lips will contact the reflector 11 along the line 14 simultaneously, and this arrangement will also permit a limited rocking movement by the reflector 12 about the line or axis 14. The reflector holder for the movable reflector 12 is further provided with an arm 184, into which is threaded an adjustable screw 185 which is made integral with an anti-friction knob 186. This knob co-operates with a cam 187 which is rotatably mounted in a bushing or bearing 188, staked on the base plate 23. The movable reflector holder has a lever arm 190 bent at right angles to the surface of the reflector, and this lever arm is fitted to slide freely in a slot on the offset extension 191 on the holder for the fixed reflector 11. One end of a spring 192 is anchored at 193 on an extended part of the fixed reflector holder (Figures 6, 12 and 13), and the other end of the spring, anchored at 194, exerts a pull on the lever 190, tending to rock the reflector 12 about its axis 14, and forcing the knob 186 against the cam 187. It will be apparent that the force of the spring 192 is balanced by the reactions of forces at the cam and at the axis 14 of the reflectors, and that a component of this force is exerted against the inclined faces of the lips 182 and 183, so that when the cam 187 is rotated, the reflector 12 will have imparted to it a rocking movement about its axis 14 against the tension of the spring 192.

The cam 187 is fastened to the shaft 195 by a screw 196. The bearing bushing 188 is made of a resilient material, and is slotted longitudinally, as shown at 197, and "sprung" so as to pinch the shaft and thereby eliminate the clearance and lost motion between the shaft and its bearing. This also provides the friction necessary to hold the cam in its adjusted position. On the upper end, the shaft is fastened to a dial disc 198, which is knurled on its outer periphery so that it can be rotated by the fingers. This dial is provided with a scale graduated to show the pupil diameters in millimeters, when read opposite an indicator mark 199 (Figure 5). On the under side of the dial disc, a stud 200 is provided, which serves to limit its motion in both directions in the path of a stop or stud 201 on the base plate 23 (Figures 16 and 17).

The screw 185 for the anti-friction knob 186, is a means for initially adjusting or calibrating the angular position of the movable reflector 12 relative to the reflector 11. A lock nut 202 secures the screw in its adjusted position.

The reflectors 11¹ and 12¹ for measuring the pupil diameters of the left eye are symmetrically positioned with respect to those just described for the right eye, as shown in Figure 12. However, the means and mechanisms for adjusting the angular relations of the reflectors 11 and 12 are also used for the reflectors 11¹ and 12¹. To do this, the holder for the movable reflector 12¹ has a lever arm extension 190¹ which is provided, on its under side, with a shoulder stud 203¹ (Figures 6 and 12), which engages a slot at one end of a link member 204, and a similar shoulder stud 203 on the under side of the lever arm 190 engages a slot at the other end of the link 204, so that when the cam 187 is rotated, both of the reflectors 12 and 12¹ have imparted to them a rocking movement. A spring 192¹, anchored at 193¹ on an extension of the holder for the reflector 11¹, exerts a pull on the lever 190¹, tending to rock the reflector 12¹ about its axis 14¹ and against the reaction of the link 204. It will be apparent, from Figure 12, that both of the springs 192 and 192¹ tend to pull the cam follower button 186 against the cam 187. The direction and the force of the spring 192¹ is such that it will also pull the edge of the reflector 12¹ and the inclined surfaces of the guide lips 182¹ and 183¹ against the edge of the fixed reflector 11¹, and maintain them in contact during the rocking motion of the reflector 12¹. Further, the two lever arms 190 and 190¹ are so positioned and proportioned that the link 204 will transmit to the reflector 12¹ an angular motion which is substantially of the same magnitude as that of the reflector 12, produced by the rotation of the cam 187, and hence the dial scale divisions on the disc 198 are applicable in measuring the pupil diameter of the right or of the left eye.

Thus, when measuring the pupil diameters of the right eye, the operator observes the pupillary images through the lens 13, and adjusts the dial disc 198 to obtain the tangency of the pupillary images, when the dial scale will indicate the diameter of the pupil. Similarly, when measuring the pupil diameter of the left eye, the operator observes the pupillary images through the lens 13¹, then adjusts the dial disc 198 to bring them into tangency, and reads the diameter of the pupil as indicated on the dial scale.

Near one end, the link 204 has a U-shaped downward projection 205 (Figures 6 and 12), and a screw 206 is threaded into one leg of the U and bears against the other leg. The link is made of a resilient material, and the formation of the U is initially nearly closed at the top, and spread and held apart by the force exerted by the screw 206. It will be evident that by the adjustment of this screw the effective length of the link 204 can be varied, and thereby the angular position of the reflector 12¹ be adjusted or calibrated with respect to fixed reflector 11¹. A lock nut 207 may be provided to fix the screw 206 in its adjusted position.

The mounting of the lens 13 in its case or holder 208 is shown in Figure 15. The lens is retained in its holder by the resilient wire ring 209 which is snapped into a groove in the holder. The holder is secured on the case 151 by the spring retainer 210 which fits into parallel grooves on the holder and exerts pressure against the side of the groove and the inside wall of the case.

The making of a permanent record or chart involves the recording of the light values to which the pupil of the eye is subjected, in successive steps, by the manipulation of the metering disc, and the recording of the corresponding pupil diameters caused or induced by such light values. Since the pupil reacts much more rapidly to increasing variations in light intensities than to decreasing variations, the metering disc is preferably arranged to produce an increasing sequence of illuminations upon the pupil of the eye.

A graphic chart illustrating the above scheme of recording is shown in Figure 18. The concentric circular arcs 215 on this chart represent the successive light values projected upon the pupil by the series of metering apertures on the metering disc, the largest circle representing the lowest degree of illumination, while the smallest circle the highest degree of illumination. Across the central portion of this chart is marked a series of small rectangular divisions, one for each concentric arc, and in these divisions are printed the light values corresponding to the successive arcs. For example, if the metering apertures are adapted to transmit light intensities in geometrical progression in the ratio of 1.587 for the successive steps, and if the lowest illumination projected on the pupil of the eye is .100 foot candle, corresponding to the largest arc, then the illumination intensities represented by the successive smaller arcs will be as shown.

The heavy radial lines identified by the numbers 8 to 2 represent the pupil diameters in millimeters, and the light radial subdivisions represent $\frac{1}{10}$ of a millimeter. The range of pupil diameters represented on the chart varies from 8.4 to 1.5 millimeters which encompasses the maximum variations in the pupillary diameters of the human eye, induced by the lowest to the highest levels of illumination to which it is responsive.

The heavy line 216 represents the shape of a graph of the pupillary reactions of a human eye when measured on the present instrument. The short radial lines or steps represent the successive illumination values on the pupil, while the arcuate lengths between the steps represent the diametral changes in the pupil, induced by the change in illumination. On this graph, for example, the pupil diameter corresponding to .100 foot candle of illumination is 7.17 millimeters; to .159 foot candle, 6.92 millimeters, etc., and to 1638 foot candles, 2.10 millimeters. On this chart the limits of the pupillary reactions of the normal human eye may be represented, for example, by the light curved lines 217 and 218, which is of value for purposes of comparison and the classification of particular cases. On a practical chart, the various reference lines and figures would preferably be printed in colors, so as to allow the graph 216 to stand out prominently for ease of comparison and interpretation. The chart also has spaces allotted to indicate whether only one eye is illuminated, or both eyes simultaneously; also an identification number and date. Other pertinent information and explanations can, of course, be provided for, if desired; for example, on the back face of the chart. The spaces for illumination values, if standardized, can be printed in, or left blank, to be filled in by hand when the illumination is varied in different investigations.

The means for producing the chart on the instrument will be explained with reference to the Figures 5, 16 and 17. The dial disc 198 is provided with two tapered pins 219 and 220 which fit snugly the corresponding holes 221 and 222 of the chart 223 (Figure 18), so that the chart, which is preferably made of light cardboard, will be held and retained on the dial disc by these pins. The diameter of the chart is somewhat smaller than the outside knurled diameter of the dial disc, so that it will not interfere with the turning or rotation of it by the fingers. The dial disc is beveled, as shown at 224, which allows the easy separation and removal of the chart from the dial disc.

The channel-shaped member 83 which is rigidly fastened to the stud 66, extends above the dial disc, and supports a slide member 225 which is secured by two shoulder studs 226 riveted to the under side of the slide, and sliding in a slot 227 provided on the part 83. Near its left end, the slide 225 supports, in a vertical position, an inking device or ink pencil 228, of a well-known type, adapted to trace a line on the chart 223, as the slide 225 is moved or the dial disc 198 is rotated. The ink pencil is freely supported in a hole at 229 on the slide member, and in another hole directly above it at 230, which is on a formed part 231 of a vertical extension 232 of the slide 225. The inking point 233 bears upon the chart with sufficient force, provided by the weight of the ink pencil, to trace a fine ink line upon the chart at all times. The ink pencil is easily removed and replaced. Ink pencils with different colored inks may be inserted, when it is desired; for instance, to trace the curves for the right and left pupils of the eye in different colors on the same chart. In order to prevent excessive play or wobbling of the ink pencil in a vertical plane, a projection 234 is provided on the vertical extension 232 of the slide, which is guided in a groove formation 235, formed on the upper end of a vertical extension 236 of the side wall of the channel member 83.

The radial steps on the pupillary curve represent the successive light values projected on the pupil of the eye, as explained in connection with Figure 18, and these radial steps are produced by the sliding movement of the ink pencil, imparted to it by the slide 225. The movement of the slide is controlled by the cam 86, co-operating with an anti-friction button 237 fastened to an adjusting screw 238, which is threaded into an upturned lip 239 on the slide 225. By the adjustment of this screw, the initial position of the inking point 225 of the ink pencil can be accurately adjusted on the largest circular arc, as shown at the point 240 (Figure 18). A spring 241 is anchored at one end on a grooved pin 242 which is supported in holes in the sides of the channeled member 83, and at the other end on a similar grooved pin 243 which is supported in holes on the sides of the slide 225, so that the spring tends to move the slide and forces the button 237 continuously in contact with the cam 86. The cam 86 is rigidly connected to the metering wheel 65 and the notched wheel 80, as has previously been explained, and the outline of this cam is so designed that, as the metering wheel is turned from one metering aperture to the next, or from one notch to the next on the notched wheel 80, the slide will move the point 233 of the ink pencil, through the action of the spring 241, from one circular arc to the next, on the chart 223.

To operate the device, the metering disc is adjusted with the smallest aperture in the light field, through which it is desired to illuminate the pupil of the eye, and this will automatically position the inking point 225 on the circular arc corresponding to the metering aperture chosen. The operator now observes the pupil images of the right eye through the lens 13, and turns the dial disc 198 so as to bring the pupil images into tangency. The termination of the line traced on the chart will indicate the pupil diameter caused by the illumination of the pupil, which corresponds to the metering aperture in the light field. Next, the operator turns the metering wheel to bring the adjacent metering aperture into the light field, which will induce a change in the pupil diameter, and then turns the dial disc to obtain the tangency of the pupillary images, resulting in the tracing of the arc indicating the new pupil diameter. These operations are repeated for all the remaining metering apertures, completing the graph for the pupil.

To trace the graph for the pupil of the left eye, the metering wheel is adjusted with the smallest aperture in the light field of the left eye, and observing the pupil images through the lens 13¹ and turning the dial disc to obtain the tangency of the pupil images. The operation of the metering wheel and dial disc is identical with that for the pupil of the right eye. The graphs for the pupils of the right and left eyes can be traced on the same chart, with different colored inks if desired, or, the graphs can be traced on separate charts.

If it is desired to illuminate only the pupil of the eye which is being measured, the light can be blocked off from the other eye by the interposition of an opaque shield with the slide 127 (Figures 9 and 10). If, on the other hand, it is desired to illuminate the pupils of both eyes equally and simultaneously, the light passing through the unequal metering apertures 21 and 21¹ (Figure 2), for illuminating the pupils of the right and left eyes, can be equalized by the adjustment of the light source 3 and condenser 4 relative to these apertures, or by the optical wedges in the discs 139 (Figures 9 and 10), or by the adjustment of a polarized disc (Figure 11), relative to another polarized screen in the slide or holder 127.

If no permanent graph of the pupils is desired, the chart 223 and ink pencil 228 are omitted or removed, and the pupil diameters read directly from the scale on the dial disc 198.

The instrument is preferably supported on the arm of a chair or on a stand, so that it can be adjusted to the eyes of the subject in a sitting position, and toward this end the bottom of the casing is provided with a bracket 250 (Figure 6), in which turns the swivel 251, having a rod 252 integral with it, which in turn is connected with some well-known adjustable means provided on a chair or stand.

While the preferred forms of the invention have been shown and described herein, it is to be understood that various changes may be made in the details of construction and in the combination and arrangement of the several parts, within the scope of the claims, without departing from the spirit of this invention.

What is claimed as new is:

1. In an eye-testing apparatus, means for illuminating the pupil of one eye; a base plate; two reflectors mounted adjacent one another on said plate and disposed at an angle for forming two separate images of the illuminated pupil; a pivotal bearing for one of said reflectors; a lens fixed in a position to receive the image rays from the reflectors for the viewing of the pupil images by an operator; a scale device of pupil diameters in operative connection with the pivoted reflector, and a pointer for said scale; means for adjusting the position of the scale by the operator for changing the angle between said reflectors, for shifting the pupil images into a position of tangency, said angle being dependent upon the diameter of the pupil, which is indicated on said scale.

2. In an eye-testing apparatus, means for projecting on the pupil of an eye a series of predetermined light intensities for causing successive changes in the diameter of the pupil; a base plate; two reflectors mounted adjacent to one another on said plate and disposed at an angle for forming two separate images of the pupil; a pivotal bearing for one of said reflectors; a lens fixed in a position for the viewing of the pupil images by an operator; a recording device having a chart holding means, and means for indicating on a chart, when positioned on said holder, the light intensities projected on the pupil; said recording device comprising a member in operative connection with the pivoted reflector, and means for adjusting the position of the member for changing the angle between the reflectors, for shifting the pupil images into a position of tangency, said angle being dependent upon the diameter of the pupil, and provision for recording on said chart the pupil diameters.

3. In an eye-testing apparatus, means for exposing the pupil of an eye to a series of predetermined light intensities for causing successive changes in the diameter of the pupil; a lens positioned in the front of the eye for forming an image of the pupil; a base plate; a reflector supported in a fixed position on said plate, and another reflector mounted for a rocking movement adjacent the first reflector, said reflectors being disposed to receive the rays from said lens to reflect two separate images of the pupil so that they may be viewed by an operator; a recording device having a chart holding means, and means for indicating on a chart, when positioned on said holder, the light intensities projected on the pupil; said recording device comprising a member in operative connection with the rocking reflector, and means for adjusting said member to shift the pupil images into a position of tangency, said adjustment being a measure of the pupil diameter, and provision for recording on said chart the pupil diameters.

4. In an eye-testing apparatus, a source of light, and means for dividing the light field of said source to follow two distinct paths for illuminating the pupils of both eyes simultaneously, and means for adjusting the separation of said light paths to correspond to the interpupillary distance of the eyes; two separate pairs of reflectors mounted on a base plate, each pair being adapted to form two distinct images of the pupil of one of the eyes, while both eyes are illuminated; a pivotal mounting for one of the reflectors of each pair, and a scale device of pupil diameters in operative connection with the pivoted reflectors, and a pointer for said scale; means for adjusting the position of the scale by an operator for changing the angle between said reflectors, to cause the shifting of the pupil images into a position of tangency, said angle being a measure of the pupil diameter which is indicated on said scale.

5. In an eye-testing apparatus in combination with an illumination system comprising means for projecting on the pupil of an eye a series of predetermined light intensities; a base plate; a rotatable disc and means for mounting said disc on the base plate; a polarizing screen supported on said disc and means for adjusting the position of said screen to polarize the light intensities in predetermined planes; two reflectors mounted adjacent to one another on said plate and adapted to form two distinct images of the pupil, and a pivotal bearing for one of said reflectors; a recording device having a chart holding means, and means for indicating on said chart, when positioned on said holder, the light intensities projected on the pupil; said recording device comprising a member in operative connection with the pivoted reflector, and means for adjusting the position of said member for changing the angle between the reflectors, for shifting the pupil images into a position of tangency, said angle being a measure of the pupil diameter, and provision for recording on said chart the pupil diameters.

6. In an eye-testing apparatus in combination with an illumination system comprising means for exposing the pupil of an eye to a series of predetermined light intensities; a base plate; a series of colored screens and a rotatable mounting for said screens supported on the base plate, and means for bringing the different color screens successively into the field of light by the rotation of said mounting; two reflectors supported adjacent one another on the base plate, and disposed to receive the light rays for reflecting two distinct images of the pupil, and a pivoted bearing for one of said reflectors; a recording device having a chart holding means, and means for indicating on a chart, when positioned on said holder, the light intensities incident on the pupil; said recording device comprising a member in operative connecton with the pivoted reflector, and means for adjusting the position of the member for changing the angle between the reflectors, for shifting the pupil images into a position of tangency, said angle being dependent upon the pupil diameter, and provision for recording on said chart the pupil diameters.

7. In an eye-testing apparatus, means for illuminating the pupil of either eye of a subject; a base plate, and a reflector anchored in a fixed position on said plate; another reflector mounted for rocking movement adjacent to the first reflector, said reflectors being disposed to reflect two distinct pupil images of one of the eyes, so that they may be observed by an operator, and means for adjusting the angle between the reflectors, for shifting the pupil images into a position of tangency, said angle being a measure of the pupil diameter; another fixed reflector anchored on the base plate, and another reflector mounted for rocking movement adjacent to the fixed reflector, said reflectors being disposed to reflect two distinct images of the pupil of the other eye, so that they may be observed by the operator, and a connection between the two rocking reflectors, whereby the means for adjusting the angle between the first recited reflectors is also adapted to adjust the angle between the last recited reflectors, for bringing the pupil images into a position of tangency; a recording device having a chart holding means, and means for indicating on a chart, when positioned on said holder, the illumination values incident upon the pupils of the eyes, said recording device being in operative connection with the means for adjusting the angle between the first recited reflectors, and provision for recording on said chart the pupil diameters.

8. An eye-testing apparatus comprising, in combination, means for exposing the pupils of both eyes of a subject simultaneously to a graduated series of light intensities; a base plate and two reflectors supported adjacent one another on said plate, and disposed to receive the light rays from one of the eyes for reflecting two distinct images of the pupil so that they may be observed by an operator; a pivotal mounting for one of said reflectors; a recording device having a chart holding means, and means for indicating on a chart, when positioned on said holder, the values of the light intensities incident on the pupils of the eyes; operative connection between the recording device and the pivoted reflector, and means for adjusting the angle between the reflectors, for shifting said pupil images into a position of tangency, while the pupils of both eyes are illuminated, said angle being a measure of the pupil diameter, and provision for recording the values of the pupil diameters.

9. An eye-testing apparatus comprising, in combination, a device for recording the pupil diameters of the eye, a source of light, a condenser lens for said source, and a disc provided with a series of variable apertures; a rotatable support for said disc, and means for positioning said apertures successively in the field of light by the step-by-step rotation of said support; two pairs of reflectors disposed to receive the light rays from said apertures, one pair of reflectors reflecting a set of rays to the pupil of one eye, and the other pair of reflectors reflecting another set of rays to the pupil of the other eye, for illuminating the pupils of both eyes simultaneously, and means for adjusting the position of one of the reflectors of each pair for the proper positioning of the illumination rays on the pupils of the eyes; said recording device having a chart holding means, and means for indicating on a chart, when positioned on said holder, the illumination values directed on the eyes; two separate pairs of reflectors disposed so that each pair will receive the light rays from the illuminated pupils of one of the eyes for forming two distinct images of each pupil; a pivotal mounting for one of the reflectors of each pair, and operative connection between said reflectors; means for imparting motion to one of said reflectors by the manipulation of the recording device for changing the angle between said reflectors, for shifting the pupil images into a position of tangency, said angle being a measure of the pupil diameter, and provision for recording the pupil diameters.

10. An eye-testing apparatus comprising, in combination, a device for recording the pupil diameters of the eye, a source of light, a condenser lens for said source, and means for projecting the light rays to illuminate the pupils of both eyes; a disc provided with a series of variable apertures, a rotatable support for said disc, and means for positioning said apertures successively in the field of light by the step-by-step rotation of said support; means for adjusting the position of the apertures on said support so that an aperture in the field of light will pass light rays for the illumination of the pupil of one eye only, or for the illumination of the pupil of the other eye only, or for the illumination of the pupils of both eyes simultaneously; said recording device having a chart holding means, and means for indicating on a chart, when positioned on said holder, the illumination values projected on the pupil of either eye; two pairs of reflectors disposed so that each pair will receive light rays from the pupil of one of the eyes, for forming two images of each pupil; a pivotal bearing for one of the reflectors of each pair, and operative connection between the pivoted reflectors; means for imparting motion to one of the pivoted reflectors by the manipulation of the recording device for changing the angle between the reflector pairs, for shifting the pupil images into a position of tangency, said angle being a measure of the pupil diameter, and provision for recording the pupil diameters.

11. In an eye-testing apparatus in combination with a device for recording the pupil diameters of the eye, means for illuminating the pupils of both eyes, comprising a base plate, a source of light, a condenser lens for said source, and provision for supporting said source and condenser on the base plate, said provision comprising mechanism for adjusting the position of the source and condenser in two directions at right angles to one another, said adjustments allowing the centering of the illumination on the pupil of one eye, or the centering of the illumination on the pupil of the other eye, or the positioning of the illumination on the pupils of both eyes simultaneously; said recording device having a chart holding means, and means for indicating on a chart, when positioned on said holder, the illumination values directed on the pupil of either eye; two pairs of reflectors disposed so that each pair will receive light rays from the pupil of one of the eyes for forming two images of said pupil; means for mounting one of the reflectors of each pair for a rocking movement and operative connection between the rocking reflectors; means for changing the angle of the reflectors of each pair by the manipulation of the recording device, and provision for recording the pupil diameters.

12. An eye-testing apparatus comprising, in combination, a device for the recording of the pupil diameters of the eyes, a source of light, a condenser lens for said source, and two pairs of reflectors disposed in the field of light, for projecting a separate set of light rays on the pupil of each eye; a set of slide holders provided with various optic screens and filters, and provision for interchangeably inserting said slides in the path of either set of rays, so as to modify the illumination projected on the pupils of the eyes in order to determine their influence on the pupil diameter; said recording device having a chart holding means, and means for indicating on a chart, when positioned on said holder, the illumination values projected on the pupil of an eye; a pair of reflectors positioned to receive rays for forming two images of the pupil; a pivotal mounting for one of the reflectors, and operative connection between the pivoted reflector and the recording device for changing the angle between the reflectors, for shifting the pupil images into a position of tangency, said angle being a measure of the pupil diameter, and provision for recording the pupil diameters.

13. An eye-testing apparatus comprising, in combination, a device for the recording of the pupil diameters of the eyes, a source of light, a condenser lens for said source, and two pairs of reflectors disposed in the field of light, for projecting a separate set of light rays on the pupil of each eye; a set of rotatable discs, and means for providing said discs with different filters or screens; a base plate, and means for interchangeably mounting said discs on the base plate and in the path of each set of light rays; means for rotating said discs for bringing the different screens successively to intercept the sets of rays so as to modify the illumination on the pupil; said recording device having a chart holding means, and means for indicating on a chart, when positioned on said holder, the light intensities directed on the pupil of an eye; a pair of reflectors disposed for forming two images of the pupil; a pivotal mounting for one of the reflectors, and means for changing the angle between the reflectors by the manipulation of the recording device, for shifting the pupil images into a position of tangency, said angle being dependent on the diameter of the pupil, and provision for recording the pupil diameters.

14. In combination with an eye-testing apparatus, a device for recording the pupil diameters of the eyes; an illumination system comprising means for projecting a separate set of light rays on the pupils of both eyes simultaneously; a shade member for each eye, a support for said members, and means for sliding the members in a horizontal plane on said support, for adjusting them to the interpupillary distance of the eyes; a reflector for each member disposed in the paths of said light rays, and a movable mounting for each of said reflectors on said support; co-operative connection between each member and its reflector for causing said sets of rays to be continuously directed on the pupils of the eyes during the adjustment of said member; said recording device having a chart holding means, and means for indicating on a chart, when positioned on said holder, the values of the light intensities projected on the pupils of the eyes; two pairs of reflectors, each pair positioned to receive light rays from the pupil of one of the eyes, and means for mounting one of the reflectors of each pair for a rocking movement, and operative connection between the rocking reflectors; means for changing the angle of the reflectors of each pair by the manipulation of the recording device, and provision for recording the pupil diameters.

15. In an eye-testing apparatus for the measurement of the pupil diameters of the eye, in combination with an illumination system comprising a source, and a condenser lens for said source; a rotatable disc provided with a series of graduated apertures, and means for positioning said apertures successively in the field of light of said source, for producing predetermined light intensities on the pupil of the eye; a reflector supported in a fixed position on a base plate, and another reflector mounted for rocking movement adjacent to the first reflector, said reflectors being disposed to receive rays for forming two separate images of the pupil; a rotatable dial, and operative connection between said dial and the rocking reflector; means for changing the angle between the reflectors by the rotation of said dial, for moving the pupil images into a position of tangency; means for attaching a graphical chart on said dial; a member adapted to support a pen to trace a line on said chart, and co-operative connection between the disc and said member for imparting a movement to the member by the rotation of said disc, to cause the pen to trace radial lines on said chart to indicate the illumination values on the pupil, said pen being also adapted to trace arcs of circles by the independent rotation of the dial, said arcs representing the pupil diameters when the pupil images appear in tangency.

16. An eye-testing apparatus comprising, in combination, a device for the recording of the pupil diameters of the eye, an illumination system for projecting on the pupils of the eyes a series of light intensities; a pair of reflectors for forming two separate images of the pupil of one eye; a base plate and a bracket for anchoring one of the reflectors in a fixed position on said plate, and means for mounting the other reflector for a rocking movement relative to the first reflector; a rotatable shaft mounted on said plate, and means for imparting a rocking motion to the reflector by the rotation of said shaft, for shifting the pupil images into a position of tangency; another similar pair of reflectors mounted on the base plate for the pupil of the other eye, and a link connection between the movable reflectors of each pair, whereby the rotation of the shaft will impart substantially the same angular motion to both reflectors; said recording device having a chart holding means, and means for indicating on a chart, when positioned on said holder, the light intensities projected on the pupils of the eyes; operative connection between the recording device and said shaft, and means for recording on the chart the pupil diameters.

NICHOLAS MILLER.

REFERENCES CITED

The following references are of record in the file of this patent:

UNITED STATES PATENTS

| Number | Name | Date |
|---|---|---|
| 1,873,675 | Tillyer | Aug. 23, 1932 |
| 1,698,013 | DeZeng | Jan. 8, 1929 |
| 2,287,345 | Erickson | June 23, 1942 |
| 1,938,002 | Amen | Dec. 5, 1933 |
| 1,889,456 | Tillyer | Nov. 29, 1932 |
| 1,387,811 | Stoner | Aug. 10, 1921 |
| 930,209 | Mills | Aug. 3, 1909 |
| 1,160,764 | Robinson et al. | Nov. 16, 1915 |
| 2,213,711 | Lueck | Sept. 3, 1940 |
| 2,057,983 | Spitler et al. | Oct. 20, 1936 |
| 670,923 | Allen et al. | Apr. 2, 1901 |
| 1,631,329 | Patterson | June 7, 1927 |
| 2,180,015 | Moulton | Nov. 14, 1939 |
| 1,115,408 | DeZeng | Oct. 27, 1914 |
| 1,601,394 | Hunsicker | Sept. 28, 1926 |
| 596,044 | Meyrowitz et al. | Dec. 21, 1897 |
| 2,302,554 | Kingsbury | Nov. 17, 1942 |
| 1,721,208 | Currier | July 16, 1929 |
| 2,046,646 | Miller | July 7, 1936 |
| 2,192,385 | Reason | Mar. 5, 1940 |
| 1,686,962 | Deninson | Oct. 9, 1928 |
| 1,760,208 | Pfeiffer | May 27, 1930 |
| 1,579,532 | Henker | Apr. 6, 1926 |
| 2,104,552 | Blee et al. | Jan. 4, 1938 |

FOREIGN PATENTS

| Number | Country | Date |
|---|---|---|
| 458,106 | Great Britain | Dec. 14, 1936 |
| 449,109 | Great Britain | June 22, 1936 |
| 489,577 | Great Britain | July 29, 1938 |

OTHER REFERENCES

Reeves: Article in Psychological Review, vol. 25, 1918, pp. 330–340.